United States Patent
Moganty et al.

(10) Patent No.: US 11,949,071 B2
(45) Date of Patent: Apr. 2, 2024

(54) IONIC LIQUIDS FOR SOLVATING CYCLIC CARBONATES

(71) Applicant: NOHMs Technologies, Inc., Rochester, NY (US)

(72) Inventors: Surya Moganty, Henrietta, NY (US); Gabriel Torres, Rochester, NY (US); Jonathan Lee, Rochester, NY (US)

(73) Assignee: NOHMs Technologies, Inc., Rochester, NY (US)

( * ) Notice: Subject to any disclaimer, the term of this patent is extended or adjusted under 35 U.S.C. 154(b) by 308 days.

(21) Appl. No.: 14/714,224

(22) Filed: May 15, 2015

(65) Prior Publication Data

US 2015/0333374 A1 Nov. 19, 2015

Related U.S. Application Data

(60) Provisional application No. 61/993,733, filed on May 15, 2014.

(51) Int. Cl.
*H01M 10/0569* (2010.01)
*H01M 10/052* (2010.01)
*H01M 10/0567* (2010.01)

(52) U.S. Cl.
CPC ..... *H01M 10/0569* (2013.01); *H01M 10/052* (2013.01); *H01M 10/0567* (2013.01); *H01M 2300/0028* (2013.01); *H01M 2300/004* (2013.01)

(58) Field of Classification Search
CPC ........... H01M 10/0569; H01M 10/052; H01M 10/0567; H01M 2300/0028; H01M 2300/0044; H01M 2300/004
See application file for complete search history.

(56) References Cited

U.S. PATENT DOCUMENTS

| | | | |
|---|---|---|---|
| 2005/0147889 A1* | 7/2005 | Ohzuku | H01M 4/131 429/231.1 |
| 2006/0035137 A1* | 2/2006 | Maruo | H01M 10/0569 429/188 |
| 2008/0138700 A1* | 6/2008 | Horpel | H01M 2/14 429/129 |
| 2010/0304225 A1* | 12/2010 | Pascaly | H01G 11/62 429/342 |
| 2010/0311615 A1* | 12/2010 | Qu | C25D 3/665 205/322 |
| 2011/0070504 A1* | 3/2011 | Matsumoto | H01M 10/0525 429/325 |
| 2012/0039824 A1 | 2/2012 | Archer et al. | |

(Continued)

FOREIGN PATENT DOCUMENTS

WO WO 2013009731 A3 * 4/2013 .......... H01M 10/052

OTHER PUBLICATIONS

Lee, J.S., et al. "Ionic Liquids Containing an Ester Group as Potential Electrolytes", Electrochemistry Communications, vol. 8, pp. 460-464, published Feb. 15, 2006. (Year: 2006).*

(Continued)

*Primary Examiner* — Stewart A Fraser
*Assistant Examiner* — Lilia Nedialkova
(74) *Attorney, Agent, or Firm* — Cozen O'Connor

(57) ABSTRACT

Ionic liquids that can be used to solvate cyclic carbonate esters and halogenated analogues thereof are disclosed.

14 Claims, 2 Drawing Sheets

(56) References Cited

U.S. PATENT DOCUMENTS

2014/0154588 A1* 6/2014 Archer ............ H01M 10/052
429/335
2015/0093655 A1* 4/2015 Kozelj ............ H01G 11/62
429/345

OTHER PUBLICATIONS

DiLeo, R.A., et al. "Battery Electrolytes Based on Saturated Ring Ionic Liquids: Physical and Electrochemical Properties", Electrochimica Acta, vol. 109, pp. 27-32, published Jul. 18, 2013. (Year: 2013).*

Lu, Y., et al. "Ionic Liquid-Nanoparticle Hybrid Electrolytes and their Application in Secondary Lithium-Metal Batteries", vol. 24, pp. 4430-4435, published Jul. 12, 2012. (Year: 2012).*

Le, M.L.P., et al. "Influence of Solvent Addition on the Properties of Ionic Liquids", The Journal of Physical Chemistry C, vol. 116, pp. 7712-7718, published Mar. 14, 2012. (Year: 2012).*

Lane, G.H., et al. "The electrochemistry of lithium in ionic liquid/organic diluent mixtures", Electrochimica Acta, vol. 55, pp. 8947-8952, published Aug. 12, 2010. (Year: 2010).*

Lee, J.S., et al. "Ionic liquids containing an ester group as potential electrolytes", Electrochem. Comm, 8, pp. 460-464, published Feb. 15, 2006. (Year: 2006).*

Rennie, Anthony J.R. et al. "Ionic liquids containing sulfonium cations as electrolytes for electrochemical double layer capacitors", The Journal of Physical Chemistry C, vol. 119, pp. 23865-23874, published Sep. 30, 2015. (Year: 2015).*

Shirota, H. et al. "Ultrafast dynamics of pyrrolidinium cation ionic liquids", Journal of Chemical Physics, vol. 122, p. 184512, published May 10, 2005. (Year: 2005).*

Shimojo, K., et al. "Extractive Solubilization, Structural Change, and Functional Conversion of Cytochrome c in Ionic Liquids via Crown Ether Complexation", Analytical Chemistry, vol. 78, No. 22, pp. 7735-7742, published Nov. 15, 2006. (Year: 2006).*

Xu, Kang, Nonaqueous Liquid Electrolytes for Lithium-Based Rechargeable Batteries. Chemical reviews Oct. 2004, vol. 104, No. 10, pp. 4303-4417.

* cited by examiner

IONIC LIQUIDS FOR SOLVATING CYCLIC CARBONATES

TECHNICAL FIELD

The embodiments in this invention generally describe novel ionic liquids that can be used to solvate at cyclic carbonate esters and its halogenated analogues.

BACKGROUND

Cyclic carbonate esters, preferably ethylene carbonate and its halogenated analogues, are critical for the performance of lithium ion batteries due to its polymerization at the anode, forming an SEI film that protects the anode from degradation and prevents further decomposition of the electrolyte components. Ethylene carbonate and its halogenated analogues however have a high melting point relative to room temperature and needs to be solvated to be useful in an electrochemical cell. State-of-the-art electrolytes employ the use of linear carbonates to solvate ethylene carbonate, but are flammable and decompose into gaseous and toxic species within a battery. At low temperatures, they are incapable of effectively solvating the ethylene carbonate and it precipitates, crippling battery performance. See, for example, US20120039824.

There is a need in the art to solvate ethylene carbonate and its precipitates in order to improve the ion lithium battery performance.

SUMMARY

The present invention provides for functionalized ionic liquids, and ionic liquid-based electrolyte combinations that allow for high solvation of cyclic carbonate esters, allowing for an electrolyte formulation that exhibits high ionic conductivity, excellent cathodic and anodic stability, wide temperature operation, and high electrochemical stability for secondary lithium batteries. This invention optimizes non-flammable electrolyte formulations based on ionic liquids, lithium salts, organic co-solvents, film forming additives/co-solvents, and nano-particle additives that address problems associated with carbonate precipitation at low temperatures, flammability, thermal instability, and instability at high voltages.

This application describes the ionic liquid composition and methods of preparing the ionic liquid composition for use in a Li-ion battery. In particular, this invention is related to the method of functionalized ionic liquids so that they overcome the precipitation of cyclic carbonates at low temperatures.

One aspect of this invention pertains to a method of lowering the crystallization and melting points of cyclic carbonates by combining the cyclic carbonate with a functionalized ionic liquid described by the formula $C^+A^-$, wherein $A^-$ is an anion selected from a group consisting of halides, nitrates, phosphates, imides, borates, phosphazines, acetates, sulfonates; and $C^+$ is an organic cation selected from the group consisting of ammoniums, sulfoniums, phosphoniums, and any 5 or 6 membered heterocyclic ring having 1 to 3 heteroatoms as ring members selected from nitrogen, oxygen, and sulfur, wherein one of the atoms in the heterocyclic ring, including the nitrogen, oxygen or sulfur, of the cation are substituted with one or more moieties selected from the group consisting of halides, oxygen, nitrogen, sulfur, phosphorus, alkanes, esters, ethers, ketones, carbonyls, alkoxyalkanes, alkenes, aryls, nitriles, silanes, sulfones, thiols, phenols, hydroxyls, amines, imides, aldehydes, carboxylic acids, alkynes, carbonates, and acid anhydrides, wherein any of the carbon or hydrogen atoms in the above moieties are optionally further substituted with halides, oxygen, nitrogen, sulfur, phosphorus, alkanes, esters, ethers, ketones, carbonyls, alkoxyalkanes, alkenes, aryls, nitriles, silanes, sulfones, thiols, phenols, hydroxyls, amines, imides, aldehydes, carboxylic acids, alkynes, carbonates, and acid anhydrides.

In an embodiment, at least one of the moieties on the heterocyclic ring of the cation is an alkylsilane.

In an embodiment, the method of lowering the crystallization and melting points of cyclic carbonates further comprises covalently bonding the at least one moiety onto a metal or metal oxide particle.

In an embodiment, the metal oxide particle is a micro- or nano-particle.

In an embodiment, the cyclic carbonate is selected from group consisting of ethylene carbonate, fluoroethylene carbonate, lactones, a cyclic carbonate comprising substituted halogen or haloalkane groups, and any mixture thereof.

In an embodiment, the method of lowering the crystallization and melting points of cyclic carbonates comprises adding an organic-hybrid material.

Another aspect of the invention pertains to an electrolyte formulation for secondary batteries with a liquidus range extending to at least −50° C., comprising a functionalized ionic liquid described by the formula $C^+A^-$, wherein $A^-$ is an anion selected from a group consisting of halides, nitrates, phosphates, imides, borates, phosphazines, acetates, sulfonates; and $C^+$ is an organic cation selected from the group consisting of ammoniums, sulfoniums, phosphoniums, and any 5 or 6 membered heterocyclic ring having 1 to 3 heteroatoms as ring members selected from nitrogen, oxygen, and sulfur, wherein one of the atoms in the heterocyclic ring of the cation are substituted with one or more moieties selected from the group consisting of halides, oxygen, nitrogen, sulfur, phosphorus, alkanes, esters, ethers, ketones, carbonyls, alkoxyalkanes, alkenes, aryls, nitriles, silanes, sulfones, thiols, phenols, hydroxyls, amines, imides, aldehydes, carboxylic acids, alkynes, carbonates, and acid anhydrides, wherein any of the carbon or hydrogen atoms in the moieties are optionally further substituted with halides, oxygen, nitrogen, sulfur, phosphorus, alkanes, esters, ethers, ketones, carbonyls, alkoxyalkanes, alkenes, aryls, nitriles, silanes, sulfones, thiols, phenols, hydroxyls, amines, imides, aldehydes, carboxylic acids, alkynes, carbonates, and acid anhydrides; a cyclic carbonate; an alkali metal salt; and an organic co-solvent.

In an embodiment, the cation is lithium.

In an embodiment, the total molar concentration of the alkali metal salt in the electrolyte formulation is between about 0.1 molar to about 2 molar.

In an embodiment, the cyclic carbonate is selected from the group consisting of ethylene carbonate, fluoroethylene carbonate, lactones, a cyclic carbonate comprising substituted halogen or haloalkane groups, and any mixture thereof.

In an embodiment, the organic co-solvent is one or more species selected from the group consisting of open-chain carbonates, cyclic carbonates, carboxylic acid esters, nitriles, ethers, sulfones, ketones, lactones, dioxolanes, glymes, crown ethers, and mixtures thereof.

In an embodiment, the co-solvent is between about 5 wt % to about 85 wt % of the total electrolyte mass.

In an embodiment, the electrolyte formulation further comprising an organic-inorganic hybrid material.

In an embodiment, the organic-inorganic hybrid material comprises a metal oxide micro- or nano-particle covalently bonded to an ionic liquid that is added as an additive between at about 0.1 wt. % to about 10 wt % of the total electrolyte mass.

In an embodiment, the functionalized ionic liquid is between about 5 wt % to about 90 wt. % of the total electrolyte mass.

Another aspect of the invention pertains to an electrochemical cell comprising a positive electrode; a negative electrode; and an electrolyte formulation for secondary batteries with a liquidus range extending to at least −50° C., comprising a functionalized ionic liquid described by the formula $C^+A^-$, wherein $A^-$ is an anion selected from a group consisting of halides, nitrates, phosphates, imides, borates, phosphazines, acetates, sulfonates; and $C^+$ is an organic cation selected from the group consisting of ammoniums, sulfoniums, phosphoniums, and any 5 or 6 membered heterocyclic ring having 1 to 3 heteroatoms as ring members selected from nitrogen, oxygen, and sulfur, wherein one of the atoms in the heterocyclic ring of the cation are substituted with one or more moieties selected from the group consisting of halides, oxygen, nitrogen, sulfur, phosphorus, alkanes, esters, ethers, ketones, carbonyls, alkoxyalkanes, alkenes, aryls, nitriles, silanes, sulfones, thiols, phenols, hydroxyls, amines, imides, aldehydes, carboxylic acids, alkynes, carbonates, and acid anhydrides, wherein any of the carbon or hydrogen atoms in the moieties are optionally further substituted with halides, oxygen, nitrogen, sulfur, phosphorus, alkanes, esters, ethers, ketones, carbonyls, alkoxyalkanes, alkenes, aryls, nitriles, silanes, sulfones, thiols, phenols, hydroxyls, amines, imides, aldehydes, carboxylic acids, alkynes, carbonates, and acid anhydrides; cyclic carbonate; an alkali metal salt; and an organic co-solvent.

In an embodiment, the positive electrode comprises a lithium metal oxide or phosphate with an electrochemical window of 3 to 6 volts relative to lithium.

In an embodiment, the negative electrode comprises at least one of graphite, silicon, lithium titanate, or lithium metal.

In an embodiment, the cation is lithium.

In an embodiment, the total molar concentration of the alkali metal salt in the electrolyte formulation is between about 0.1 molar to about 2 molar.

In an embodiment, the cyclic carbonate is one of ethylene carbonate, fluoroethylene carbonate, lactones, a cyclic carbonate comprising substituted halogen or haloalkane groups, or any mixture thereof.

In an embodiment, the organic co-solvent is one or more species selected from the group consisting of open-chain carbonates, cyclic carbonates, carboxylic acid esters, nitriles, ethers, sulfones, ketones, lactones, dioxolanes, glymes, crown ethers, and mixtures thereof.

In an embodiment, the co-solvent is between about 5 wt % to about 85 wt % of the total electrolyte mass.

In an embodiment, the electrochemical cell comprises an organic-inorganic hybrid material.

In an embodiment, the organic-inorganic hybrid material comprises a metal oxide micro- or nano-particle covalently bonded to an ionic liquid that is added as an additive between at about 0.1 wt % to about 10 wt % of the total electrolyte mass.

In an embodiment, the functionalized ionic liquid between about 5 wt % to about 90 wt % of the total electrolyte mass.

As used herein, the moieties connect the ionic liquid to metal or metal oxide particles, both of which may be micro- or nano-particles. Examples of metal oxide nanoparticles are silica and titania.

As used herein, the organic hybrid material refers the organic ionic liquid covalently bonded to the inorganic metal or metal oxide particles.

BRIEF DESCRIPTION OF THE DRAWINGS

The present invention, in accordance with one or more embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Figure 1:
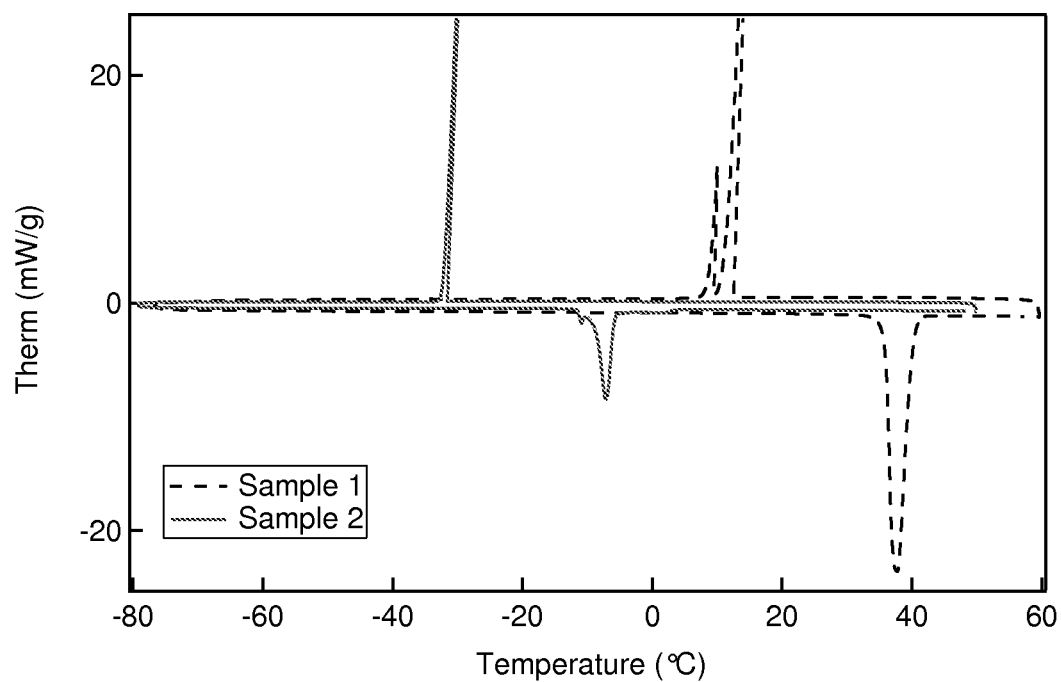
FIG. 1 is a DSC profile comparing neat ethylene carbonate with ethylene carbonate mixed dimethyl carbonate.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

The invention describes novel ionic liquids whose organic, heterocyclic cations have appended moieties that allow the ionic liquids to solvate cyclic carbonates in a wide range of concentrations. The ionic liquids are also stable at a wide range of temperatures, and can be used to inhibit polysulfide shuttling in the lithium-sulfur electrochemical system. Additionally, this invention relates to the use of said ionic liquids along with other co-solvents and additives as high performance, nonflammable, wide operating temperature range electrolyte formulations for electrochemical cells.

The proposed technology incorporates the advantages of non-flammable ionic liquids and SEI-forming cyclic carbonate esters to form a thermally and electrochemically stable electrolyte for lithium secondary batteries. Preliminary research shows that ionic liquid and carbonate ester formulations are stable up to 6 V relative to lithium, showing promise as an electrolyte compatible with high voltage cathode materials. The research also indicates that the functionalized ionic liquids exhibit high solvation of solid carbonate esters with no sign of crystallization or precipitation down to −80° C.

As an electrolyte additive, the surface chemistry of inorganic nanoparticles (e.g. silica) can be tuned with functionalized ionic liquid ligands to facilitate uniform dispersion in ionic liquids and carbonates. $SiO_2$-IL particles can host hundreds of ionic liquid ligands allowing for multiple chemistries via co-attachment of desirable functionalities onto a single particle. With functionalized organic ligands, the solubility of these particles within a carbonate is increased, will not agglomerate, and as a result sharply depress the crystallization and melting points of the carbonate.

The functionalities are typically, but not always, appended onto a nitrogen in the heterocyclic cation. The functionalities include but are not limited to alkanes, esters, ketones, ethers, other carboxylic acid derivatives and their sulfur analogues, cyano groups, alkenes, and similarly halogenated or further functionalized analogues of the preceding. A preferred example is an ester functionalized pyrrolidinium cation, where the ester moiety allows the ionic liquid to act as an aprotic polar solvent with a high dielectric constant. The example is as a result superior solvent of solid carbonates to the alkylated heterocyclic cations that are found in typical ionic liquid molecules. An ionic liquid electrolyte in general is capable of forming a solvation shell around lithium ions within the context of an electrolyte formulation.

Ionic liquids with different functional groups are synthesized following the synthesis procedures that are known in the art. The preceding example is synthesized in the following typical fashion.

EXAMPLE

Ionic liquids with different functional groups were synthesized following the synthesis procedures that are known in the art. See, for example, Nonaqueous Liquid Electrolytes for Lithium-based Rechargeable Batteries, DOI: 10.1021/cr030203g and Ionic liquids Containing an Ester Group as Potential Electrolytes"—DOI:10.1016/j.elecom.2006.01.009. The following example was synthesized in a typical fashion.

Example 1

1-methylpyrrolidinium and methyl 4-chlorobutyrate were dissolved in ethyl acetate and stirred at 70° C. for 48 hours. After the quaternization reaction, the crude product was washed with diethyl ether, using a separation funnel, to remove unreacted reagents and solvent. The ester functionalized pyrrolidinium chloride salt was then dissolved in de-ionized water and lithium bis(trifluoromethylsuflonyl) salt was added. The organic phase was washed with de-ionized water. Dichloromethane was removed from the product using the rotavap technique. The product was dried in a vacuum oven at 100° C. for 24 hr.

Differential scanning calorimetry, DSC, was used here to confirm that a given mixture of a cyclic carbonate and ionic liquid remains liquid over a wide temperature range. In DSC, a sample was subjected to heat flux adiabatically to maintain a constant increase or decrease in temperatures. The instrument measured the amount of heat required to maintain this temperature rate, and an increase or decrease of the requisite heat was indicative of a phase change.

In Examples 2 to 5, a TA Instruments DSC Q20 was used. 5 mg of a given sample were added to a TA Tzero aluminum pan with a TA Tzero aluminum hermetic lid and sealed with a TA Tzero Press. An empty pan and lid were used as the reference and were loaded onto the DSC autosampler tray. The heating and cooling fluid was nitrogen gas. The samples were subjected to a heating, cooling and then heating cycle, with a heating/cooling ramp rate of 2° C. per minute. The temperature range was −80° C. to 50° C.

Samples as listed in Table 1 were combined in a dry argon filled glovebox at room temperature. The ionic liquids were synthesized in the usual fashion described in Example 1. The room temperature ionic liquids were added to warmed ethylene carbonate at 40° C. in 8 mL vials. The resulting uniform liquid mixture showed no signs of precipitation at room temperature. The vials were transferred out of the glovebox and 5 mg of each sample were added to the DSC pan and sealed and subjected to the DSC regime.

TABLE 1

Mixtures of ethylene carbonate and ionic liquid solvents

| Sample # | Solvent | % Ethylene carbonate by weight | Ethylene carbonate concentration (mol/L) |
|---|---|---|---|
| 1 | None | 100 | — |
| 2 | Dimethyl Carbonate | 25 | 4 |
| 3 | 1-butyl-1-methylpyrrolidinum TFSI | 25 | 5 |
| 4 | 1-(3-acetylbutyl)-1-methylpyrrolidinum TFSI | 25 | 5 |
| 5 | 1-trimethoxysilylpropyl-1-methylpyrrolidinum TFSI | 25 | 5 |

Example 2 Determination of Liquidus Range of Dimethyl Carbonate and Ethylene Carbonate Mixture Via Differential Scanning Calorimetry In the thermal profiles provided by the DSC, exothermic and endothermic peaks were indicative of crystallization and melting points, respectively. Shoulders indicated glass transition temperatures. In FIG. 1, it was shown that a solution of dimethyl carbonate suppressed the melting point of ethylene carbonate from 38° C. to −8° C., as well as shifted the crystallization point significantly to −36° C.

Figure 2:
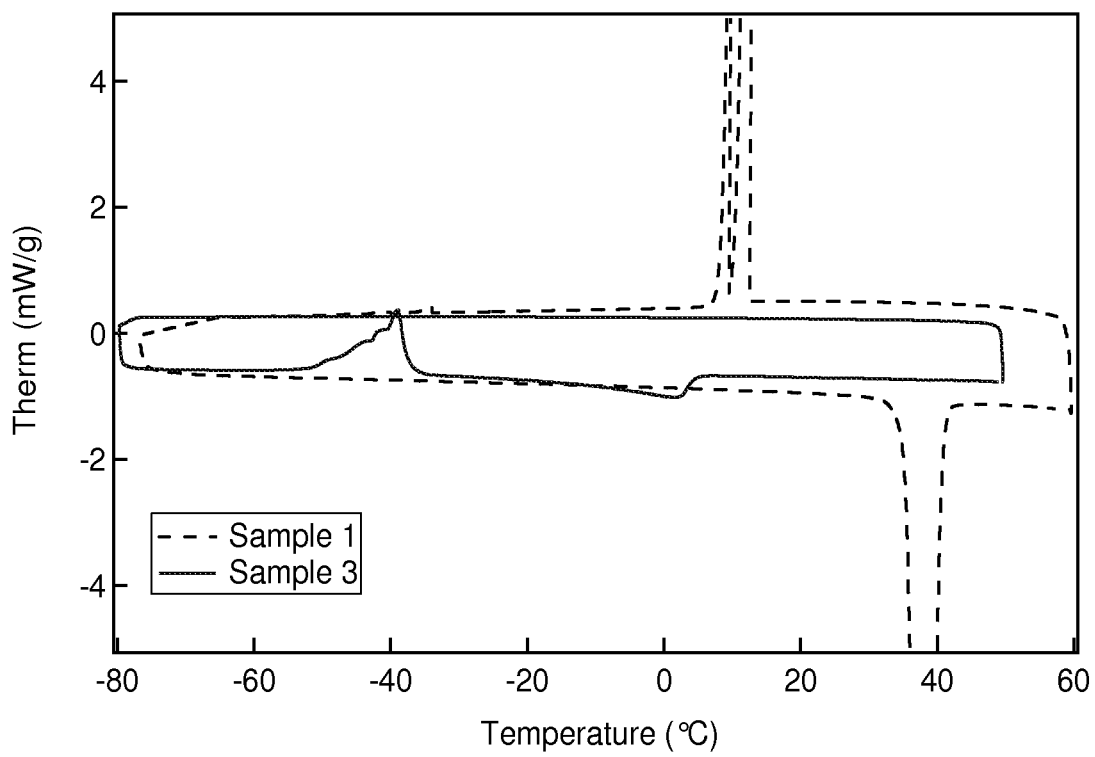
FIG. 2 is a DSC profile comparing neat ethylene carbonate with ethylene carbonate mixed 1-butyl-1-methylpyrrolidinium TFSI.

Example 3 Determination of Liquidus Range of 1-Butyl-1-Methylpyrrolidinium TFSI and Ethylene Carbonate Mixture Via Differential Scanning Calorimetry In FIG. 2, a mixture of ethylene carbonate along with a conventional ionic liquid, 1-butyl-1-methylpyrrolidinium TFSI resulted in a change of the phase behavior.

A crystallization point was noted −39° C. as well as a glass transition temperature 5° C. This was not quite an improvement over conventional lithium ion electrolyte solvents such as dimethyl carbonate, as it would be preferable to have an unambiguously liquid electrolyte to best facilitate ion transport.

Figure 3:
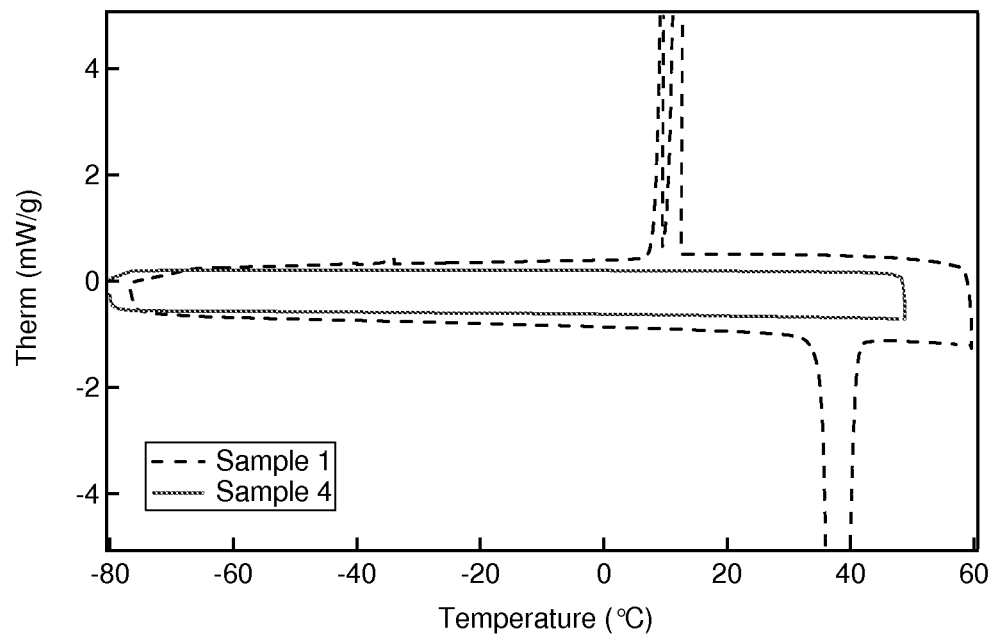
FIG. 3 is a DSC profile comparing neat ethylene carbonate with ethylene carbonate mixed 1-(3-acetylbutyl)-1-methylpyrrolidinium TFSI.

Example 4 Determination of Liquidus Range of 1-(3-Acetylbutyl)-1-Methylpyrrolidinium TFSI and Ethylene Carbonate Mixture Via Differential Scanning Calorimetry In FIG. 3, a mixture of ethylene carbonate along with a functionalized ionic liquid, 1-(3-acetylbutyl)-1-methylpyrrolidinium TFSI resulted in a significantly changed thermal profile.

There were no observed phase changes or glass transitions, thus indicating that the ester moiety on the ionic liquid cation interrupted the crystallization of ethylene carbonate down to at least 80° C.

Figure 4:
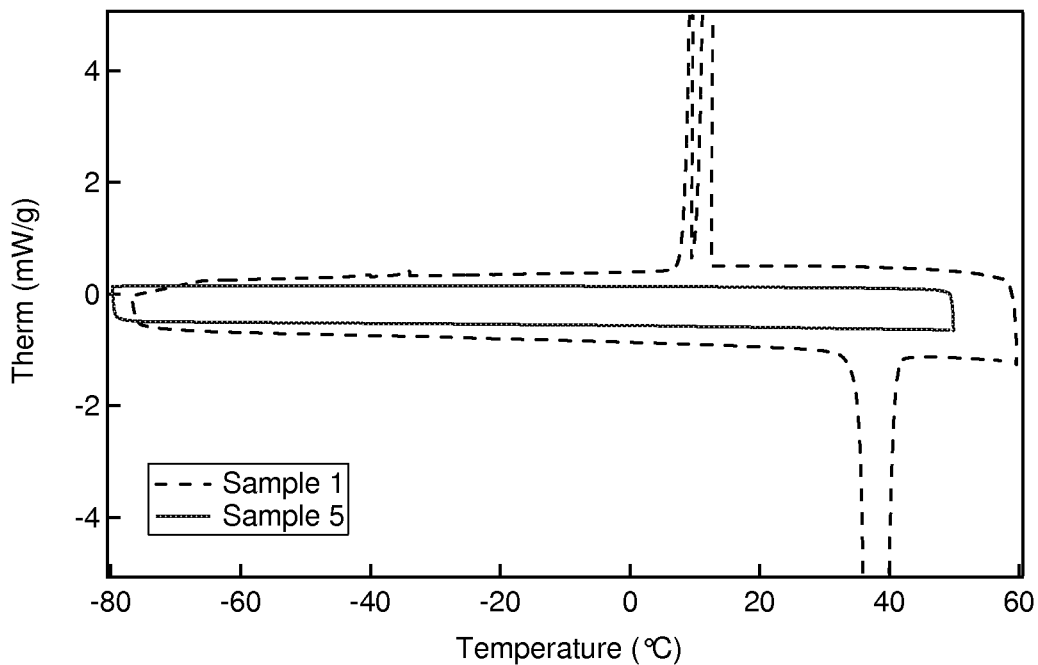
FIG. 4 is a DSC profile comparing neat ethylene carbonate with ethylene carbonate mixed 1-trimethoxysilylpropyl-1-methylpyrrolidinium TFSI.

Example 5 Determination of Liquidus Range of 1-Trimethoxysilylpropyl-1-Methylpyrrolidinium TFSI and Ethylene Carbonate Mixture Via Differential Scanning Calorimetry In FIG. 4, a mixture of ethylene carbonate along with a functionalized ionic liquid, 1-trimethoxysilylpropyl-1-methylpyrrolidinium TFSI similarly resulted in a significantly changed thermal profile indicating no phase transition or glass transition temperature was observed.

FIG. 2 is a DSC profile comparing neat ethylene carbonate with ethylene carbonate mixed 1-butyl-1-methylpyrrolidinium TFSI.

FIG. 3 is a DSC profile comparing neat ethylene carbonate with ethylene carbonate mixed 1-(3-acetylbutyl)-1-methylpyrrolidinium TFSI.

FIG. 4 is a DSC profile comparing neat ethylene carbonate with ethylene carbonate mixed 1-trimethoxysilylpropyl-1-methylpyrrolidinium TFSI.

The invention describes novel ionic liquids whose organic, heterocyclic cations have appended moieties that allow said ionic liquids to solvate cyclic carbonates in a wide range of concentrations. The ionic liquids were also stable at a wide range of temperatures. Additionally, this invention relates to the use of said ionic liquids along with other co-solvents and additives as high performance, nonflammable, wide operating temperature range electrolyte formulations for electrochemical cells.

Before describing several exemplary embodiments of the invention, it is to be understood that the invention is not limited to the details of construction or process steps set forth in the following description. The invention is capable of other embodiments and of being practiced or being carried out in various ways.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A method of lowering the crystallization and melting points of cyclic carbonate by combining the cyclic carbonate with 1-(3-acetylbutyl)-1-methylpyrrolidinium TFSI in a range of from about 1:3 wt. % to about 4:1 wt. % of a ratio of cyclic carbonate to 1-(3-acetylbutyl)-1-methylpyrrolidinium TFSI.

2. The method of claim 1 wherein the cyclic carbonate is selected from the group consisting of ethylene carbonate, fluoroethylene carbonate, lactones, a cyclic carbonate comprising substituted halogen or haloalkane groups, and any mixture thereof.

3. A method of forming an electrolyte for secondary batteries with a liquidus range extending to at least $-50°$ C. comprising adding an alkali metal salt and an organic co-solvent further comprising the method of claim 1.

4. The method of claim 3, wherein the alkali metal salt has a cation of lithium.

5. The method of claim 3, wherein the total molar concentration of the alkali metal salt in the electrolyte formulation is between about 0.1 molar to about 2 molar.

6. The method of claim 3 wherein the cyclic carbonate is selected from the group consisting of ethylene carbonate, fluoroethylene carbonate, lactones, a cyclic carbonate comprising substituted halogen or haloalkane groups, and any mixture thereof.

7. The method of claim 3 wherein the organic co-solvent is one or more species selected from the group consisting of open-chain carbonates, cyclic carbonates, carboxylic acid esters, nitriles, ethers, sulfones, ketones, lactones, dioxolanes, glymes, crown ethers, and mixtures thereof.

8. A method of forming an electrochemical cell comprising adding a positive electrode and a negative electrode further comprising the method of claim 3.

9. The method of claim 8 wherein the positive electrode comprises a lithium metal oxide or phosphate with an electrochemical window of 3 to 6 volts relative to lithium.

10. The method of claim 8 wherein the negative electrode comprises at least one of graphite, silicon, lithium titanate, or lithium metal.

11. The method of claim 8 wherein the alkali metal salt has a cation of lithium.

12. The method of claim 8 wherein the total molar concentration of the alkali metal salt in the electrolyte formulation is between about 0.1 molar to about 2 molar.

13. The method of claim 8 wherein the cyclic carbonate is one of ethylene carbonate, fluoroethylene carbonate, lactones, a cyclic carbonate comprising substituted halogen or haloalkane groups, or any mixture thereof.

14. The method of claim 8 wherein the organic co-solvent is one or more species selected from the group consisting of open-chain carbonates, cyclic carbonates, carboxylic acid esters, nitriles, ethers, sulfones, ketones, lactones, dioxolanes, glymes, crown ethers, and mixtures thereof.

* * * * *